Figure 1:
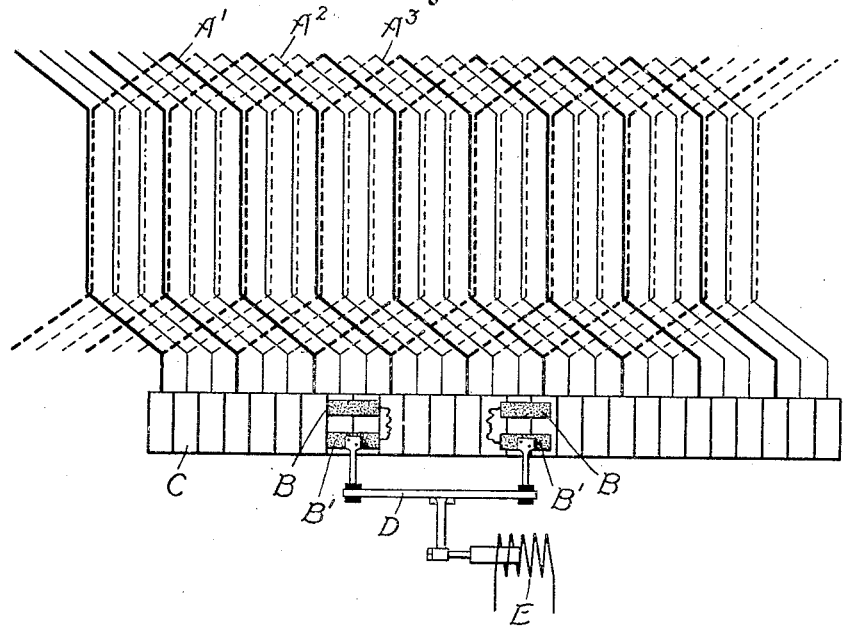

No. 860,981. PATENTED JULY 23, 1907.
M. C. A. LATOUR.
ALTERNATING CURRENT MACHINE.
APPLICATION FILED JAN. 21, 1905.

Witnesses
J. Ellis Glen.
Helen Alford

Inventor.
Marius C. A. Latour.
by Albert S. Davis
Atty.

UNITED STATES PATENT OFFICE.

MARIUS C. A. LATOUR, OF PARIS, FRANCE, ASSIGNOR TO GENERAL ELECTRIC COMPANY, A CORPORATION OF NEW YORK.

ALTERNATING-CURRENT MACHINE.

No. 860,981.

Specification of Letters Patent.

Patented July 23, 1907.

Application filed January 21, 1905. Serial No. 242,087.

*To all whom it may concern:*

Be it known that I, MARIUS CHARLES ARTHUR LATOUR, a citizen of France, residing at Paris, France, have invented certain new and useful Improvements in Alternating-Current Machines; of which the following is a specification.

My invention relates to alternating-current motors of the commutator type, and its object is to provide a novel arrangement of brushes for such machines, whereby the commutation may be improved.

It is well known in the art that when an armature coil of an alternating-current machine is short-circuited by a brush during commutation a heavy short-circuiting current flows in the coil, due to the fluctuating field which threads the coil at the moment of commutation. This short-circuit current results in heating losses, reducing the efficiency of the machine, and also produces sparking, which increases the deterioration of the commutator. In order to avoid these losses, it has been proposed heretofore to provide the armatures of alternating machines of the commutator type with two or more distinct windings connected to successive commutator segments, and to employ brushes of such width as not to bridge two segments connected to the same winding. Thus, if two parallel windings are used, the brushes are of a width equal to that of only one segment; if three windings are used the brushes have a width equal to two segments, etc. This arrangement effectually eliminates short-circuit currents and consequently improves the efficiency and reduces the sparking at starting and at low speeds. It will be seen, however, that with this arrangement only part of the armature winding is carrying current at certain times, and that the circuit of each winding is opened and closed every time a commutator segment to which it is connected passes a brush. At starting and at low speeds this is not a serious objection, but breaking the circuit of the winding at high speeds when the breaks occur with great rapidity, may produce very serious sparking. On the other hand, the short-circuit currents which are produced in an armature with a single winding are much reduced at high speeds, since the motor current and the field strength are diminished. Consequently the single winding armature gives more satisfactory operation at high speeds, while the multiple winding gives better results at starting and at low speeds.

The object of my invention is to combine the advantages of both arrangements in a single machine. I accomplish this end by providing a plurality of parallel windings connected to successive commutator segments in the usual manner, and two sets of brushes, each brush being of a width insufficient to bridge two segments connected to the same winding. At starting the two sets of brushes are in line, so that the motor starts like a motor with a plurality of windings and a single set of narrow brushes. When the motor is up to speed I shift one set of brushes so that the two sets which are in electrical connection have together sufficient width to bridge two segments connected to the same winding. Thus, at high speeds the motor acts as though it had a single winding, since none of the windings is ever open-circuited; but, on the contrary, is short-circuited at the instant of commutation.

Figure 2:
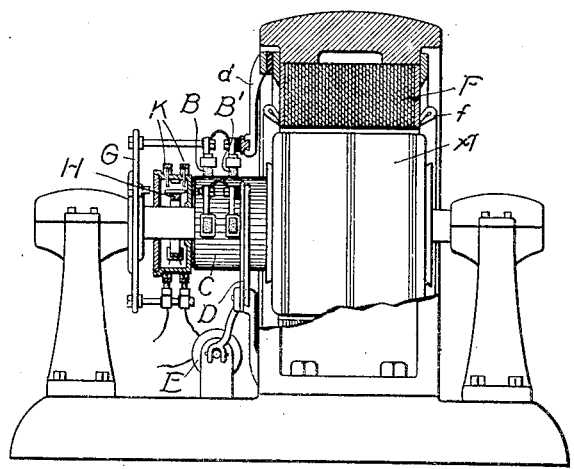
Figure 3:
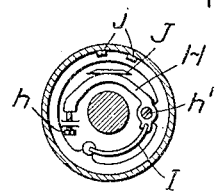

My invention will best be understood by reference to the accompanying drawing, in which Figure 1 shows diagrammatically a development of an armature having three parallel windings and provided with two sets of brushes arranged in accordance with my invention, with means for shifting one set; Fig. 2 shows a side elevation, partly in cross-section, of an alternating-current machine arranged in accordance with my invention; and Fig. 3 is a detail of the controlling device for the brush-shifting means.

Referring first to Fig. 1, $A^1$, $A^2$ and $A^3$ represent three parallel windings connected to successive commutator segments, winding $A'$ being shown in heavier lines to facilitate tracing its connections. These three windings are shown as of the series or wave type arranged for a four-pole machine. Obviously, my invention is not limited to any specific type of winding, or to a machine of any given number of poles. C represents the commutator, every third segment of which is connected to one of the three windings. B B represent one set of brushes, which may be supported in the usual manner, as will be hereinafter described. B' B' represent the second set of brushes, each of which is electrically connected to the corresponding brush of the first set. The brushes B' B' are carried by a yoke D, the position of which is controlled by a magnet winding E. The brushes have a width not greater than the width of two commutator segments, so that when the two sets of brushes are in line, as shown in Fig. 1, they cannot bridge two segments connected to the same winding. This is the position of the brushes at starting and during operation at low speeds. When the motor is operating at a higher speed, the magnet winding E is energized and the brushes B' B' are shifted toward the right a distance substantially equal to the width of a commutator segment. With the brushes thus shifted, two segments connected to the same winding are electrically connected; that is, each coil is short-circuited in undergoing commutation, and the motor operates as though it had a single-winding armature.

Fig. 2 shows a construction which may be employed in carrying out my invention. A represents the armature, and F the field which is provided with field coils f. The field coils may be either distributed or concentrated. One set of brushes B B is shown supported from yoke G carried by one of the bearings of the machine in the usual manner. The other set of brushes B′ is shown carried by the yoke D, which is rotatably mounted in guides d supported from the field structure F. The position of the yoke D is controlled by a magnet E. The circuit of magnet E may be controlled by a centrifugal device, such as is shown in Figs. 2 and 3. H represents an arm pivoted at h′ and held against the stop h, when the motor is at rest, by the spring 1. The arm H carries a contact member J, which is adapted to engage the contacts j connected to the collector rings K. When the motor reaches a certain speed, arm H is thrown outward by centrifugal force, so as to bring the member J into engagement with the members j, thereby electrically connecting the collector rings K. A circuit is thereby completed through magnet E, which is at once energized and shifts the brushes B′ to their proper position for operation at full speed.

Obviously, any other suitable arrangement for shifting the brushes may be substituted for that shown. Accordingly, I do not desire to limit myself to the particular construction and arrangement of parts here shown, but aim in the appended claims to cover all modifications which are within the scope of my invention.

What I claim as new and desire to secure by Letters Patent of the United States, is,—

1. An alternating-current motor, comprising an armature core, a plurality of closed-circuit windings each distributed around said core, a many-part commutator having successive segments connected to the several armature windings, brushes bearing on said commutator of a width insufficient to bridge two segments connected to the same winding, and means for shifting a portion of said brushes relatively to the rest.

2. An alternating-current motor, comprising an armature core, a plurality of closed-circuit windings each distributed around said core, a many-part commutator having successive segments connected to the several armature windings, brushes bearing on said commutator of a width insufficient to bridge two segments connected to the same winding, and automatic means for shifting a portion of said brushes relatively to the rest when the speed of the machine passes a predetermined limit.

3. An alternating-current motor comprising an armature core, n armature windings of the closed-circuit type each distributed around said core, a many-part commutator having successive segments connected to the several armature windings, brushes bearing on said commutator of a width not greater than (n−1) segments, and means for automatically shifting a portion of said brushes circumferentially as the speed of the motor increases.

4. An alternating-current motor, comprising an armature core, a plurality of closed-circuit windings each distributed around said core, a many-part commutator having successive segments connected to the several armature windings, brushes bearing on said commutator of a width insufficient to bridge two segments connected to the same winding, an independent support for a portion of said brushes, and means for automatically shifting said support when the speed of the motor passes a predetermined limit.

5. An alternating-current motor, comprising an armature core, a plurality of closed-circuit windings each distributed around said core, a many-part commutator having successive segments connected to the several armature windings, brushes bearing on said commutator of a width insufficient to bridge two segments connected to the same winding, an independent support for a portion of said brushes, and speed-controlled means for shifting said support.

6. An alternating-current motor, comprising an armature core, a plurality of closed-circuit windings each distributed around said core, a many-part commutator having successive segments connected to the several armature windings, brushes bearing on said commutator of a width insufficient to bridge two segments connected to the same winding, an independent support for a portion of said brushes, an electromagnet adapted to shift said support, and a centrifugal device controlling the circuit of said electromagnet.

7. An alternating-current motor, comprising an armature core, a plurality of closed-circuit windings each distributed around said core, a many-part commutator having successive segments connected to the several armature windings, two sets of brushes, each brush of one set being axially alined with and electrically-connected to a brush of the other set, the width of each brush being insufficient to bridge two segments connected to the same winding, and means for shifting said sets out of line.

8. An alternating-current motor, comprising an armature core, a plurality of closed-circuit windings each distributed around said core, a many-part commutator having successive segments connected to the several armature windings, two sets of brushes, each brush of one set being axially-alined with and electrically-connected to a brush of the other set, the width of each brush being insufficient to bridge two segments connected to the same winding, and automatic means for shifting said sets out of line when the speed of the machine passes a predetermined limit.

In witness whereof, I have hereunto set my hand this 17th day of January, 1905.

MARIUS C. A. LATOUR.

Witnesses:
HELEN ORFORD,
G. C. HOLLISTER.